July 28, 1970   J. A. ANDERSEN ET AL   3,522,057
PROCESS OF DEGREENING AND RIPENING FRUIT
Original Filed Dec. 20, 1966   2 Sheets—Sheet 1

INVENTORS
JOHN A. ANDERSEN
RUSSELL M. MAGNER
BY
ATTORNEY

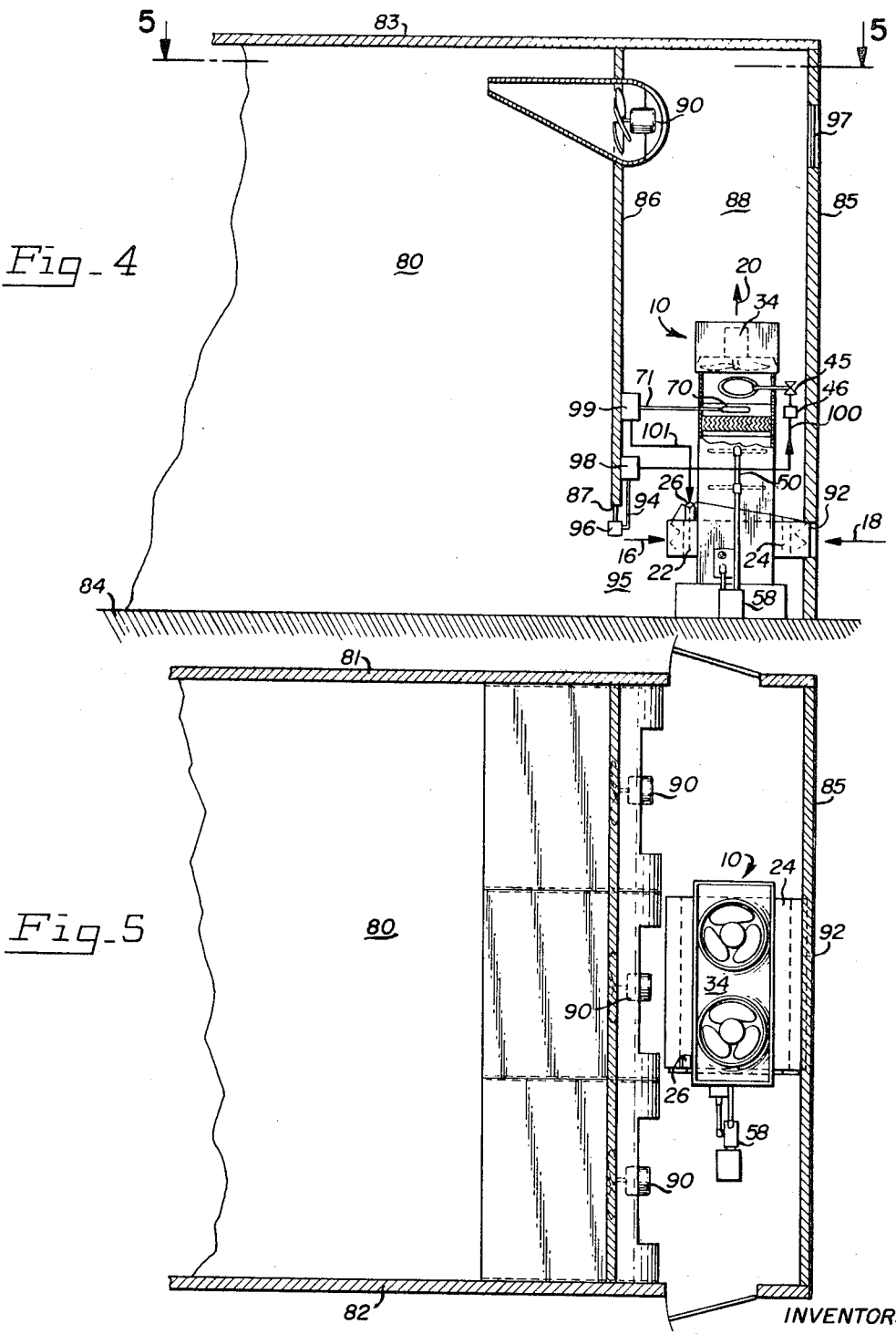

United States Patent Office 3,522,057
Patented July 28, 1970

3,522,057
PROCESS OF DEGREENING AND
RIPENING FRUIT
John A. Andersen, Los Altos, and Russell M. Magner,
Atherton, Calif., assignors to General Industrial Equipment Company, Palo Alto, Calif., a corporation of
California
Original application Oct. 20, 1966, Ser. No. 588,221.
Divided and this application Jan. 16, 1968, Ser.
No. 719,806
Int. Cl. A23l 1/00
U.S. Cl. 99—103                                    4 Claims

ABSTRACT OF THE DISCLOSURE

Process of degreening and ripening fruit by treating stored fruit with a circulating air stream maintained at a selected fruit processing temperature. The dew point temperature of the air stream is maintained as closely as possible to the temperature of the coldest portion of the fruit until reaching a selected dew point temperature which is thereafter maintained until the fruit is degreened and ripened.

---

This application is a division of our copending application Ser. No. 588,221, now Pat. No. 3,388,863, filed on Oct. 20, 1966, which in turn is a continuation of application Ser. No. 366,518, filed May 11, 1964, now abandoned.

This invention relates to the humidity and temperature control of an enclosed space and more particularly to means and a method for maintaining a constant relative humidity within a confined space at a selected temperature, and further for increasing and decreasing the absolute humidity with increasing and decreasing temperature respectively.

Constant relative humidity chambers find extensive application in industry. For example, in the fruit industry it is common practice to remove fruit from trees before it has obtained the desired color or degree of ripeness and, thereafter, degreen or ripen the fruit in degreening or ripening rooms. This degreening or ripening process usually requires raising the temperature of the fruit after placement into an enclosed space such as a degreening or ripening room to approximately 72° F. This temperature is usually maintained until the fruit has achieved the desired color or degree of ripeness. Thereafter the temperature of the room is lowered to the ambient or outside temperature so that the fruit may be removed for further processing such as packing and shipping.

For the proper processing of the fruit, and particularly for the fruit to maintain its appearance, the relative humidity in the processing room should be maintained as constant as possible, particularly at the selected processing temperature. It has been found that for certain fruits a relative humidity of about 88% at a processing temperature of about 72° F. is desirable. Since the relative humidity is the ratio of the partial water vapor pressure to the vapor pressure at the processing room temperature, the relative humidity for a given amount of water in the processing room air changes with temperature. Accordingly, during the heating cycle water must constantly be added to the air if the relative humidity is to be prevented from decreasing to too low a value. Conversely, dry air must constantly be added when the temperature in the processing room is decreased to prevent the relative humidity from exceeding too high a value.

If, during the process of fruit degreening or ripening, the relative humidity falls below an optimum value for any appreciable length of time, the fruit tends to dry which deleteriously affects its market value as well as its weight. If the relative humidity is higher than an optimum value for any appreciable length of time, the fruit has a tendency to foul which can result in a severe loss. Accordingly, the process of degreening or ripening the fruit after it has been picked in a green or unripe state, as the case may be, requires that the humidity be maintained substantially constant at the processing temperature, and that water be respectively added and removed during the raising and lowering of the temperature to and from the processing temperature.

Heretofore a number of attempts have been made to inexpensively and economically maintain the relative humidity of the processing room at a selected optimum value but none, to our knowledge, have succeeded in doing so during the period of processing the fruit and further of changing the absolute humidity during the raising and lowering of the temperature in the direction towards maintaining the relative humidity substantially constant.

It is therefore a primary object of this invention to provide an apparatus for installation into a processing room which is capable of maintaining the relative humidity of the processing room constant.

It is another object of this invention to provide a means and a method for maintaining the humidity of the air within an enclosed space at a selected dew point temperature.

It is a further object of this invention to provide an enclosed space including means to inexpensively and reliably control the temperature and relative humidity therein independently of one another.

It is a further object of this invention to provide an air-conditioning device capable of controlling both the relative humidity and the temperature within an enclosed space.

It is a further objective of this invention to provide a method for controlling the relative humidity and the temperature within an enclosed space.

It is a further object of this invention to provide an apparatus and a method for maintaining the humidity of an air mass at a selected dew point temperature within an enclosed space maintained at a selected temperature.

It is another objective of this invention to provide an apparatus and a method for controlling the relative humidity within an enclosed space inexpensively and reliably by utilizing substantially wet or saturated air generated in the space to increase the humidity and substantially dry or unsaturated air from outside the space to decrease the humidity.

It is also an objective of this invention to provide a means and method for adding water to the air in an enclosed space during the raising of the space temperature and for adding dry air to the space when dropping the temperature to maintain the absolute humidity changes in the same direction as the temperature changes.

In accordance with a preferred embodiment of this invention, an apparatus is provided which continuously saturates an air stream passing therethrough adiabatically by adding water to provide a saturated air stream. The temperature of the saturated air stream is sensed with a first conventional dry bulb thermometer providing the dew point temperature. The saturated air stream is then passed through a heater which is controlled by a second conventional dry bulb thermometer located to sense the dry bulb temperature of the fruit in the space whose humidity and temperature is to be controlled.

The first and second thermometer are respectively connected to a first and second thermostat which provides a first and second temperature signal commensurate with the sensed temperature. The second temperature signal is utilized to control the temperature of the heater through which the saturated air flows to supply heat when the fruit in the chamber is below the desired chamber temperature and to inactivate the heater when the fruit in the chamber has reached or exceeded the desired chamber temperature. In this manner the chamber temperature is controlled.

The relative humidity is controlled by developing a control signal when the first temperature signal is greater than a selected dew point temperature. The control signal is utilized to operate a damper mechanism which changes the inflow port of the apparatus from communication with the enclosed space from which it receives wet air to communication with the outside from which it receives dry air. In an alternate embodiment, the control signal may be developed by comparing the first and second temperature signals and developing a difference signal which according to the psychrometric chart reflects the desired dew point temperature at the selected space temperature.

Even though this invention is being described with particular emphasis on the degreening of citrus fruits, it is to be understood that it is equally applicable to the ripening of other fruit and to many other processes which require control of temperature and humidity. For example, the apparatus and method of this invention is ideally suited for controlling the temperature and humidity of greenhouses for the growing of tropical plants, or for controlling of terrariums in which tropical animals are kept.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

FIG. 4 is a partial side view of a processing or degreening room having the device of this invention installed along an end wall;

FIG. 5 is a partial top view taken along line 5—5 of FIG. 4; and

Figure 1:
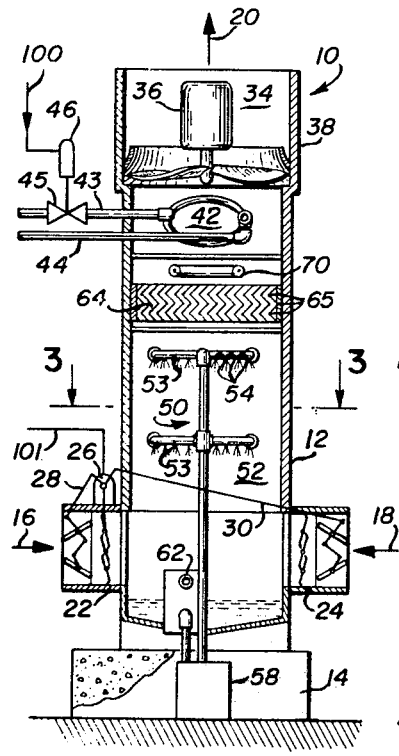
FIG. 1 is a side view, partially in section, of the air-conditioning device of this invention.
Figure 2:
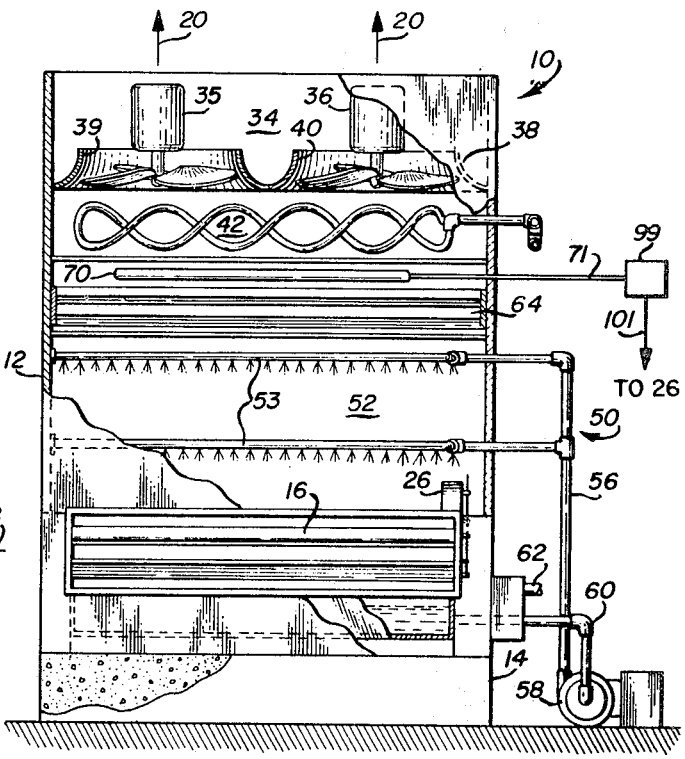
FIG. 2 is a front view, partially in section, of the device shown in FIG. 1.
Figure 3:
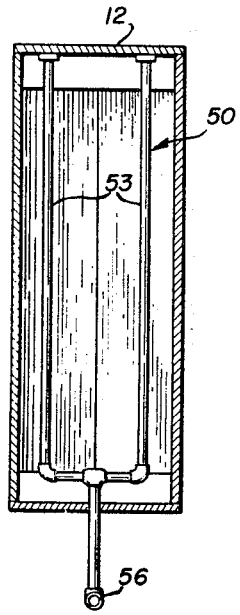
FIG. 3 is a sectional view taken along line 3—3 of FIG. 1.

Referring now to the drawings there is shown an exemplary embodiment of an air-conditioning device constructed in accordance with this invention and generally designated by reference character 10. Air-conditioning device 10 has an uprightly disposed, tubular enclosure 12 which may be of rectangular cross section as indicated, or which may take any other desired shape. Basically, enclosure 12 forms a vertical flow channel which is open at the top for discharge and which is seated upon a suitable foundation 14.

Enclosure 12 is provided with a pair of diametrically opposed input ports diagrammatically indicated by arrows 16 and 18 respectively and an output port similarly indicated at 20. Input port 16 has associated therewith an input control means 22 and input port 18 has associated therewith an input control means 24. Input control means 22 and 24 preferably take the form of adjustable dampers which are moveable between a closed and open position across the associated input ports to control the effective input port opening as will be explained. A common actuation means 26 is connected to damper 22 through linkage 28 and to damper 24 through linkage 30 to operate dampers 22 and 24 in a differential manner. In other words, actuation means 26 is connected to the dampers in such a manner that the change of one damper from its closed to its open position produces an opposite change in the other damper. Lead 101 provides the control signal.

Output port 20 formed by the open upper end of enclosure 12 is provided with an air circulating means 34 which may take the form of a pair of rotating fans 35 and 36 which draw air upwards and force the air out through output port 20. To establish an efficient flow channel utilizing fans 35 and 36 it has been found useful to seal off output port 20 by means of a closure plate 38 which includes a pair of fan openings 39 and 40 dimensioned for accommodating the fan blade of fans 35 and 36 respectively. In this manner an efficient circulating means is provided which creates an upwardly flowing air stream in enclosure 12 forcing the admission of air through input port 16 or 18 or both.

Mounted inside enclosure 12 and immediately below circulation means 34 is a heating means 42 whose function is to impart heat to the air passing therethrough. Heating means 42 may comprise a water or steam jacket in the form of a coil to which steeam from an input pipe 43 is admitted to heat the same. The steam, after heating, is returned to a steam supply through output pipe 44. Instead of utilizing steam to actuate heating means 42, an electrical heating coil may be used in which case pipes 43 and 44 are replaced by wires carrying the electrical current. Heating means 42 is provided with a heating control means which may take the form of an electrically controlled flow valve 45 in input pipe 43 having a valve control element 46 for controlling the steam flow therethrough in accordance with the amount of heat to be imparted to the air stream flowing through enclosure 12 as will be explained hereinafter. Lead 100 provides the control signal.

Also mounted inside enclosure 12 and above input ports 16 and 18 is an air stream saturation means generally designated by reference character 50 for adiabatically saturating the air stream with water. Saturation means 50 comprises a spray tree 52 including one or more spray pipes 53 each having many closely spaced, downwardly expelling openings or nozzles 54 through which water is discharged in a fine spray to saturate the upward flowing air.

Water is supplied to spray pipes 53 by means of a supply pipe 56 connected to the upstream end of a spray pump 58. The downstream end of the spray pump 58 is connected through a pipe 60 to a reservoir at the bottom of enclosure 12. In this manner a water circulating system is formed.

A water inlet, which also functions as an overflow outlet, is provided by a pipe 62. After the introduction of water into the bottom of enclosure 12 through pipe 62 the same is circulated under pressure from the pump 58 to spray tree 52 for discharge through nozzles 54 to saturate the upward flowing air.

Above spray tree 52 there is mounted, within enclosure 12, an elimination means 64 which has a large plurality of overlapping deflectors 65 which operate upon the upwardly moving stream of saturated air and eliminate or remove water droplets from the stream. In this manner the upward flowing air stream is fully saturated corresponding to a relative humidity of substantially equal to 100% and carries no unabsorbed water droplets.

Positioned between elimination means 64 and heating means 42 is a temperature sensing means 70 which may take the form of a conventional gas-filled dry bulb tube. Thermometer 70 is connected, through a tube 71, to a suitable potentiometer type thermostat 99 as will be explained hereinafter in connection with FIG. 6. The function of sensing means 70 is to provide an indication of the temperature of the saturated air stream prior to it being heated by heater means 42.

By way of summary, enclosure 12 has a pair of differentially operated input ports 16 and 18 at its bottom just above a water reservoir through which air is admitted into enclosure 12. The admitted air is forced upwards through suction fans 35 and 36 and is expelled at the top through output port 20. As the air stream travels upwards through the enclosure, it is first saturated with water and unabsorbed water droplets are expelled. Thereafter, the temperature of the saturated air stream is determined and the saturated air is passed through the heater for subsequent discharge from the enclosure.

Referring now particularly to FIGS. 4 and 5, there is shown a typical processing room 80 in which the air-conditioning device 10 of FIG. 1 is installed for maintaining a constant selected humidity while the fruit in the room is first brought up to and then maintained at a selected processing temperature. A typical processing room for degreening oranges may be 70 feet long, 20 feet wide and 18 feet high and may require typically a circulation of 30,000 cubic feet of air per minute. Processing room 80 has a pair of side walls 81 and 82, a ceiling 83 and a floor 84. Further, processing room 80 has a pair of end walls 85 only one of which is shown and a partition wall 86 extending parallel to end wall 85 and suspended from ceiling 83 to define a space 88 into which air-conditioning device 10 is placed. Partition wall 86 extends downwardly and terminates in edge 87 at a height above floor 84 which is somewhat above the opening of damper means 22. The space between edge 87 and floor 84 defines a communication channel between the main portion of processing room 80 and space 88 accommodating air-conditioning device 10.

The upper portion of partition 86 is provided with a plurality of fans 90 which push air at a desired flow rate from partitioned portion 88 into the main portion of the processing room. The air return is provided by the communication channel 95 formed between the floor 84 and lower edge 87 of partition wall 86.

End wall 85 has an opening 92 dimensioned and positioned to be in registry with damper means 24 which overlies input port 18 of air-conditioning device 10. In this manner input port 18 is in direct communication with the outside air. Input port 16, as best seen in FIG. 4, is directly opposite partition channel 95. Accordingly, when damper means 22 is fully open (so that damper means 24 is fully closed) the air intake is entirely from the processing room. Conversely, when damper means 24 is fully open the air intake is entirely from the outside.

As a practical matter it has been found that air-conditioning device 10 for degreening oranges only requires a capacity of about one-third or one-fourth of the desired flow rate across partition wall 86 so that for a flow rate of 30,000 cubic feet per minute across wall 86 an air-conditioning capacity of about 10,000 cubic feet per minute is quite sufficient. In this manner about one-third of the air continuously circulated through the processing room is controlled by air-conditioning device 10. Of course, for other applications, more or less air processing may be required.

There is also provided an exhaust damper 97 which may conveniently be incorporated in end wall 85 to maintain the pressure in processing room 80 at atmospheric pressure. When fresh air is taken into the room 80 through input port 18, the excess air is bled through exhaust damper 97. A pair of doors, one at each end of the partitioned portion, allows ready access.

A further temperature sensing means such as a gas-filled dry bulb thermometer 96 is located in opening 95 and connected to a thermostat 98 through a connection 94 which is conveniently located. Thermostat 98 provides a temperature signal commensurate with the temperature of the air circulated through room 80 and more particularly of the air passing through opening 95.

Figure 6:
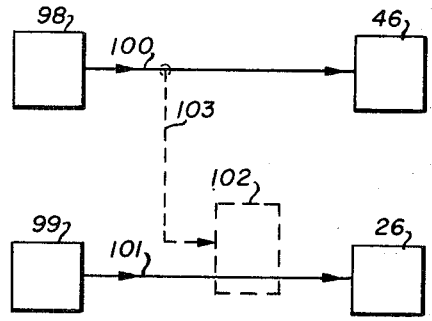
FIG. 6 is a schematic block diagram of the control system of the device shown in FIG. 1.

Referring now to FIG. 6 there is shown, in schematic form, the means utilized for controlling both the temperature and the humidity of the air being circulated through room 80. As previously explained, thermostat 98 provides a temperature signal on lead 100 commensurate with the temperature of the air returned to the partitioned portion through opening 95. which is at the temperature of the stored fruit. This temperature signal is applied to valve control means 46 and opens the same when the air return temperature is below a selected temperature. Once the stored fruit has reached or exceeds a selected temperature, valve control means 46 shuts off and heater means 42 is inactivated.

Thermostat 99 similarly provides a temperature signal on lead 101 commensurate with the temperature of the wet air mass drawn through device 10 prior to entering heating means 42 and subsequent to being saturated to a relative humidity of close to 100%. Thermostat 99 controls damper control means 26 and may be directly connected thereto and set to a desired temperature so that when that temperature is reached or exceeded it moves the dampers to let in colder air which is much drier.

Instead of setting each thermostat to provide an output only when its associated thermometer reaches a selected temperature, i.e. essentially operating in a digital fashion, the thermostats may be utilized in an analog fashion. If so used, both temperature signals are applied to a difference detecting meter 102 (through lead 101 and 103) which is set to provide a damper control signal only when the difference is indicative fo a selected temperature difference, say 2° F. This connection is shown in dotted lines. Meter 102 may take the form of a conventional differential amplifier.

In operation, citrus fruit is placed into the main portion of the processing room when the same is at a low temperature, say 35° F. At the time the processing room is loaded, it is in communication with the atmosphere so that its relative humidity is far below the desired value of about 88%. The processing room is then sealed off and thermostat 98 is set to the desired processing temperature which is typically 72° F. At the same time thermostat 99 is set to a temperature which corresponds to the necessary dew point temperature which provides the selected relative humidity at the processing room temperature. For example, if the desired processing relative humidity is 88% at the desired processing room temperature of 72° F., the dew point temperature, as determined from psychrometric charts, is about 69° F. Accordingly, thermostat 99 is set to 69° F.

The term "set" as applied to thermostat 98 and 99 is used herein to denote that the temperature signal initiates a change in the associated means it controls. For example, the temperature signal from thermostat 98, which controls valve control means 46, shuts the steam valve at the "set" temperature so that the wet air mass is no longer heated. Likewise, the temperature signal from thermostat 99, which controls baffle means 26, starts opening damper 24 and closing damper 22 at the "set" temperature so that dry cold air from the outside is admitted into enclosure 12.

Since at the start of the degreening cycle the room is cold because the fruit is cold, and thermostat 98 is set to the desired fruit processing temperature (72° F.), heat control means 46 maintains the steam valve fully open for maximum heating. At the same time thermostat 99, which is set to the desired dew point temperature (69° F.), maintains control means 26 in a position so that damper 22 is wide open. Pump 58 is started and air entering air-conditioning device 10 through input port 16 is fully saturated to about 100 percent relative humidity. The wet air mass then passes through heating element 42 where it is warmed up (which decreases the relative humidity) and is expelled through output port 20 in the partitioned portion. Fans 90 circulate the air through the processing room and back to input port 16.

As a natural consequence of locating the spray water reservoir inside and on the bottom of enclosure 12, the spray water is constantly exposed to the upwardly moving air stream of the return air entering enclosure 12 through input port 16. This return air stream heats the spray water to and thereafter maintains the spray water at a temperature which is very close to the dry bulb temperature.

The reason that the spray water temperature is not exactly equal to the dry bulb temperature of the return air stream is due to some evaporation from the surface of the spray water reservoir which produces some cooling. Generally speaking, the smaller the evaporation from the reservoir the closer will the spray water temperature be to the dry bulb temperature of the return air stream. Since the rate of evaporation depends on the spread between the dry bulb temperature and the wet bulb temperature of the air immediately in contact with the spray water reservoir surface, and since this air has a relative humidity which is substantially equal to 100% due to the spray water from spray tree 52, the dry bulb-wet bulb spread is always very small and the evaporation is negligible. For all practical purposes, therefore, the spray water is heated to and thereafter maintained at the dry bulb temperature of the return air stream.

Maintaining the spray water at the return air temperature is particularly important during the period of time during which the processing room is brought up to the processing temperature. Only after the processing temperature has been reached is input port 18 slightly opened to admit a small amount of cold dry air to maintain the air stream temperature slightly below the dry bulb temperature of the processed fruit. However, the effect on the spray water temperature of the small amount of air entering through input port 18 is negligible and the spray water remains substantially at the return air temperature. Further, the excess water from spray tree 50, and the water expelled by eliminator 64, likewise is exposed to the upward moving air stream of the return air within enclosure 12 and is heated thereby to the dry bulb temperature of the return air. It is, of course, true that the upwardly moving air stream is cooled during the adiabatic saturation process, but this cooling produces only a temperature drop of a few degrees because the air stream has a high relative humidity at the temperature at which it is returned to enclosure 12. Therefore this cooling effect on the excess and expelled water is likewise negligible.

Finally, enclosure 12 itself, together with the entire pumping system, is located in space 88 which likewise includes an upwardly moving air stream of return air which has, of course, the same dry bulb (and wet bulb) temperature as the air stream in enclosure 12 which is a part thereof. For this reason, the portion of enclosure 12 below heater 42, and the entire pumping system, is maintained at the return air temperature which in turn assists in maintaining the temperature of the spray water substantially at the dry bulb temperature of the return air. Since the dry bulb temperature of the return air is substantially equal to the temperature of the fruit stored in the processing room, the spray water temperature is maintained at and follows the fruit temperature.

Since heating element 42 constantly adds heat to the moving air mass, the air temperature and therefore the temperature of the fruit slowly increases while water vapor is constantly added. As the temperature of the stored fruit in room 80 approaches the desired temperature of say 72° F. this fact is sensed by thermometer 96 and thermostat 98 puts out a temperature signal which shuts off heating means 42. As a consequence of shutting off heating means 42 the temperature of the air passing through enclosure 12 is not heated so that the air mass leaving output port 20 now has a relative humidity of close to 100 percent.

However, before this condition is reached, the dew point temperature of the air mass will be above the dew point temperature set into thermostat 99 which therefore provides a temperature signal on lead 101 which activates damper control means 26 to admit cold air from the outside. This cold air, of course, is dry and after being fully saturated adiabatically is still colder than the temperature to which the thermostats are set. Accordingly, the colder saturated air will cause both thermostats to provide temperature signals to admit air from the processing room and to require heating. Balance is achieved when just sufficient cold and dry air from the outside is mixed with hot and wet air from the processing room so that the temperature of the air mass is maintained around the dew point temperature and the heating means raises the wet air mass moving therethrough the necessary amount to maintain the processing room at the desired processing temperature.

It is also to be noted that during the period of time necessary to bring the fruit in the processing room to the desired processing temperature, which typically takes 12 to 18 hours, water is constantly added so that the absolute humidity increases continually. During this time, the relative humidity may be maintained at a value which corresponds to the difference between the returning air mass temperature and a dew point temperature a set number of degrees below by utilizing the control means 102 shown in FIG. 6.

After the stored fruit has reached the desired processing temperature, it is typically maintained at the processing temperature for a period of 24 to 72 hours.

There has been described an air-conditioning device which performs the process of raising the temperature of cold green fruit to a selected processing temperature and thereafter for ripening of the fruit. The process provides for increasing the absolute humidity of the air used for bringing the temperature of the fruit to the processing temperature and, thereafter, for maintaining the air at a selected relative humidity. Further, the process cools the fruit temperature, after ripening, by decreasing the absolute humidity of the air used to cool the fruit.

What is claimed is:

1. The method of degreening and ripening fruit after picking, comprising the steps of:
   storing the picked fruit, which is at a first temperature below a selected processing temperature, in an enclosed space;
   forming an air stream having a dew point temperature which is maintained as closely as possible to the temperature of the coldest portion of the fruit until reaching a selected dew point temperature and which thereafter is maintained at the selected dew point temperature, and a dry bulb temperature which is maintained at the selected processing temperature; and
   expelling said air stream into the enclosed space for circulation through the stored fruit until the fruit is degreened and ripened.

2. The method of degreening and ripening fruit after picking with an air stream which first raises and thereafter maintains the temperature of the fruit at a selected processing temperature, said method comprising the steps of:
   storing the picked fruit, which is at a first temperature below said selected processing temperature, in an enclosed space;
   forming an air stream outside the enclosed space and circulating the air stream into and expelling the air stream out of the enclosed space and through the stored fruit;
   saturating the air stream outside the enclosed space to a dew point temperature which is very close to the dry bulb temperature of the air stream expelled from the enclosed space;
   heating the saturated air stream outside the enclosed space until the dry bulb temperature of the air stream expelled from the enclosed space reaches the selected processing temperature; and
   continuing the circulation process until the fruit is degreened and ripened.

3. The method of degreening and ripening fruit of claim 2 which further includes the step of maintaining the dew point temperature of the saturated air stream at a selected maximum dew point temperature by mixing the saturated air with air from the outside atmosphere whenever the saturated air stream temperature dew point temperature exceeds said selected dew point temperature whereby the air stream is maintained at a constant relative humidity after the fruit temperature reaches the selected processing temperature.

4. The method of degreening and ripening fruit after picking, comprising the following steps of:
  (a) storing the picked fruit, which is at a first temperature below a selected processing temperature, in an enclosed space;
  (b) forming a first air stream from the air in the enclosed space and expelling said first air stream into the enclosed space to cause air circulation through the stored fruit;
  (c) forming a second air stream from a selected portion of said first air stream and a selected portion of the outside atmosphere and expelling said second air stream into the enclosed space;
  (d) adiabatically saturating said second air stream with water maintained at a temperature substantially equal to the temperature of said second air stream prior to saturation to produce a saturated air stream whose relative humidity is substantially equal to 100 percent;
  (e) heating the saturated air stream until its dry bulb temperature reaches said selected processing temperature;
  (f) selecting the portions of air forming said second air stream so that the temperature of said saturated air stream, prior to being heated, does not exceed a selected dew point temperature; and
  (g) continuously following steps (b), (c), (d), (e) and (f) until the fruit is degreened and ripened.

References Cited

UNITED STATES PATENTS

| 1,829,951 | 11/1931 | Walsh | 99—103 |
| 2,079,304 | 5/1937 | Polderman | 99—103 |

MAURICE W. GREENSTEIN, Primary Examiner

J. M. HUNTER, Assistant Examiner